United States Patent
Karki et al.

(10) Patent No.: US 10,586,308 B2
(45) Date of Patent: Mar. 10, 2020

(54) DIGITAL MEDIA ENVIRONMENT FOR REMOVAL OF OBSTRUCTIONS IN A DIGITAL IMAGE SCENE

(71) Applicant: Adobe Inc., San Jose, CA (US)

(72) Inventors: Krishna Singh Karki, New Delhi (IN); Subham Gupta, Roorkee (IN); Poonam Bhalla, New Delhi (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 143 days.

(21) Appl. No.: 15/590,690

(22) Filed: May 9, 2017

(65) Prior Publication Data
US 2018/0330470 A1    Nov. 15, 2018

(51) Int. Cl.
| G06T 3/40 | (2006.01) |
| G06K 9/20 | (2006.01) |
| G06K 9/40 | (2006.01) |
| G06K 9/62 | (2006.01) |
| G06K 9/34 | (2006.01) |
| G06T 5/50 | (2006.01) |
| G06T 7/194 | (2017.01) |
| G06T 5/00 | (2006.01) |

(52) U.S. Cl.
CPC ........... *G06T 3/4038* (2013.01); *G06K 9/209* (2013.01); *G06K 9/346* (2013.01); *G06K 9/40* (2013.01); *G06K 9/62* (2013.01); *G06T 5/005* (2013.01); *G06T 5/50* (2013.01); *G06T 7/194* (2017.01); *G06T 2207/10012* (2013.01)

(58) Field of Classification Search
CPC .. H04N 13/122; H04N 13/302; H04N 13/351; H04N 1/00127; H04N 5/2628; H04N 7/152; G06K 2009/363; G06T 2207/10004; G06T 3/4038; G06T 7/194; G06T 7/593
See application file for complete search history.

(56) References Cited

U.S. PATENT DOCUMENTS

| 7,715,589 | B2 * | 5/2010 | Freeman | G06T 7/246 382/103 |
| 8,170,326 | B2 * | 5/2012 | Gulati | H04N 5/247 348/42 |
| 9,117,282 | B2 * | 8/2015 | Steinberg | G06K 9/00234 |
| 10,051,180 | B1 * | 8/2018 | Chen | G06T 7/30 |
| 2006/0083440 | A1 * | 4/2006 | Chen | H04N 5/23238 382/284 |

(Continued)

Primary Examiner — Jingge Wu
(74) Attorney, Agent, or Firm — SBMC

(57) ABSTRACT

Techniques for removal of obstructions in a digital image scene are described, in which target and source digital images that exhibit parallax, one to another, are obtained that were captured together by an image capture device at a similar point in time using two different lenses of the image capture device. A foreground obstruction is identified based on displacement in apparent position of objects in the target and source digital images. The foreground obstruction is removed from the target digital image, such as by generating an obstruction mask that represents the location of the foreground obstruction and copying pixels from the source digital image to the target digital image based on the locations identified in the obstruction mask. The target digital image with the obstruction removed is output to a user interface or service provider system, for example.

20 Claims, 7 Drawing Sheets

(56) References Cited

U.S. PATENT DOCUMENTS

| | | | |
|---|---|---|---|
| 2010/0004034 A1* | 1/2010 | Suzuki | H04M 1/60 455/569.1 |
| 2011/0074818 A1* | 3/2011 | Masuda | G06T 7/593 345/634 |
| 2011/0242289 A1* | 10/2011 | Fukushima | G06T 15/20 348/51 |
| 2012/0262569 A1* | 10/2012 | Cudak | H04N 5/2226 348/135 |
| 2013/0236105 A1* | 9/2013 | Chao | G01C 21/206 382/199 |
| 2013/0342641 A1* | 12/2013 | Morioka | G03B 35/08 348/36 |
| 2014/0002603 A1* | 1/2014 | Takahashi | H04N 19/597 348/43 |
| 2014/0009462 A1* | 1/2014 | McNamer | G06T 19/20 345/419 |
| 2014/0043434 A1* | 2/2014 | Asano | H04N 9/09 348/42 |
| 2014/0098089 A1* | 4/2014 | Sutou | G06T 7/593 345/419 |
| 2014/0133755 A1* | 5/2014 | McCloskey | G06T 11/60 382/173 |
| 2014/0241582 A1* | 8/2014 | Gaddy | G06K 9/00624 382/103 |
| 2014/0340539 A1* | 11/2014 | Venkataraman | H01L 27/14618 348/218.1 |
| 2015/0138346 A1* | 5/2015 | Venkataraman | G01B 11/22 348/135 |
| 2015/0161798 A1* | 6/2015 | Venkataraman | G01P 3/38 348/47 |
| 2015/0178595 A1* | 6/2015 | Sawada | G06T 7/571 382/195 |
| 2015/0341616 A1* | 11/2015 | Siegel | H04N 13/111 348/54 |
| 2016/0364847 A1* | 12/2016 | Bouzaraa | G06T 5/007 |
| 2017/0359523 A1* | 12/2017 | Rubinstein | G06T 5/005 |
| 2018/0046140 A1* | 2/2018 | Smithwick | G03H 1/2205 |

* cited by examiner

DIGITAL MEDIA ENVIRONMENT FOR REMOVAL OF OBSTRUCTIONS IN A DIGITAL IMAGE SCENE

BACKGROUND

Digital cameras are becoming increasingly accessible due to increased portability and inclusion into other devices. Due to this, digital cameras may be used in a variety of scenarios, including indoors, outdoors, at a sporting event, and so on. In some of these scenarios, users of digital cameras wish to capture digital images of subjects that appear behind an obstruction. For example, a user may want to capture an image of a child swinging a baseball bat behind a backstop fence, or a tiger in its enclosure at a zoo. While there is typically a good reason for these obstructions to be in their particular locations—safety, in many cases—the obstructions detract from the desired subject of the digital image.

If a digital image is captured that contains an obstruction blocking the desired subject, current systems require users to manually select the area of the obstruction, and manually fill in the area of the obstruction, such as with a digital image editing application of a computing device. Conventional systems to remove obstructions involve capturing multiple images of the same scene from different angles and using the multiple images to remove the obstruction. Additional conventional limitations include a requirement that the desired subject behind the obstruction remain stationary for each of the multiple images. Further, conventional systems used to remove obstructions require the digital camera to capture multiple images from particular requisite angles. The limitations presented by conventional systems to remove obstructions are not feasible for users in real-world scenarios, especially for inexperienced photographers or users whose desired subject for a digital image is a moving object.

SUMMARY

Techniques for removal of obstructions in a digital image scene within a digital media environment are described. In one example, two images are captured simultaneously using two different lenses of an image capture device and used to remove an obstruction from one of the images. In this way, images can be generated that include a desired subject that is not blocked by an obstruction automatically, without time-consuming user input, and without requiring substantial knowledge of photography techniques on behalf of a user.

In one example, target and source digital images that exhibit parallax, one to another, are obtained by a digital image creation system. The target and source digital images are images captured together by an image capture device, such as a digital camera, at a similar point in time using two different lenses of the image capture device. The terms "target digital image" and "source digital image" are used to distinguish the two images captured together at a similar point in time by the two different lenses of the image capture device, but these terms are not necessarily indicative of which lens captured which image or any other features of either image. Because the two lenses are installed within the image capture device at different locations, the images captured from the two lenses at the similar point in time will exhibit parallax, one to another. Generally, parallax is the effect whereby the position of an object appears to differ when viewed from different positions. Consequently, positions of objects captured in the target and source digital images will appear to differ because the respective lenses captured the target and source digital images from slightly different locations.

The digital image creation system uses the exhibited parallax to identify a foreground obstruction in the image based on displacement in apparent position of objects in the target and source digital images. For example, the digital image creation system can identify a fence as a foreground obstruction of a background that includes a tennis player in both the target and source digital images. When the foreground obstruction is identified, the digital image creation system removes the foreground obstruction from the target digital image, e.g., automatically and without user intervention.

One example technique for removing a foreground obstruction includes generation of an obstruction mask that represents the locations of the foreground obstruction in the target digital image, and copying pixels from the source digital image to the target digital image based on the locations identified in the obstruction mask. The image with the obstruction removed is then output by the digital image creation system, such as to a storage location of a user's digital images, an image editing application, a social networking application, "in the cloud" as part of a service provider system, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
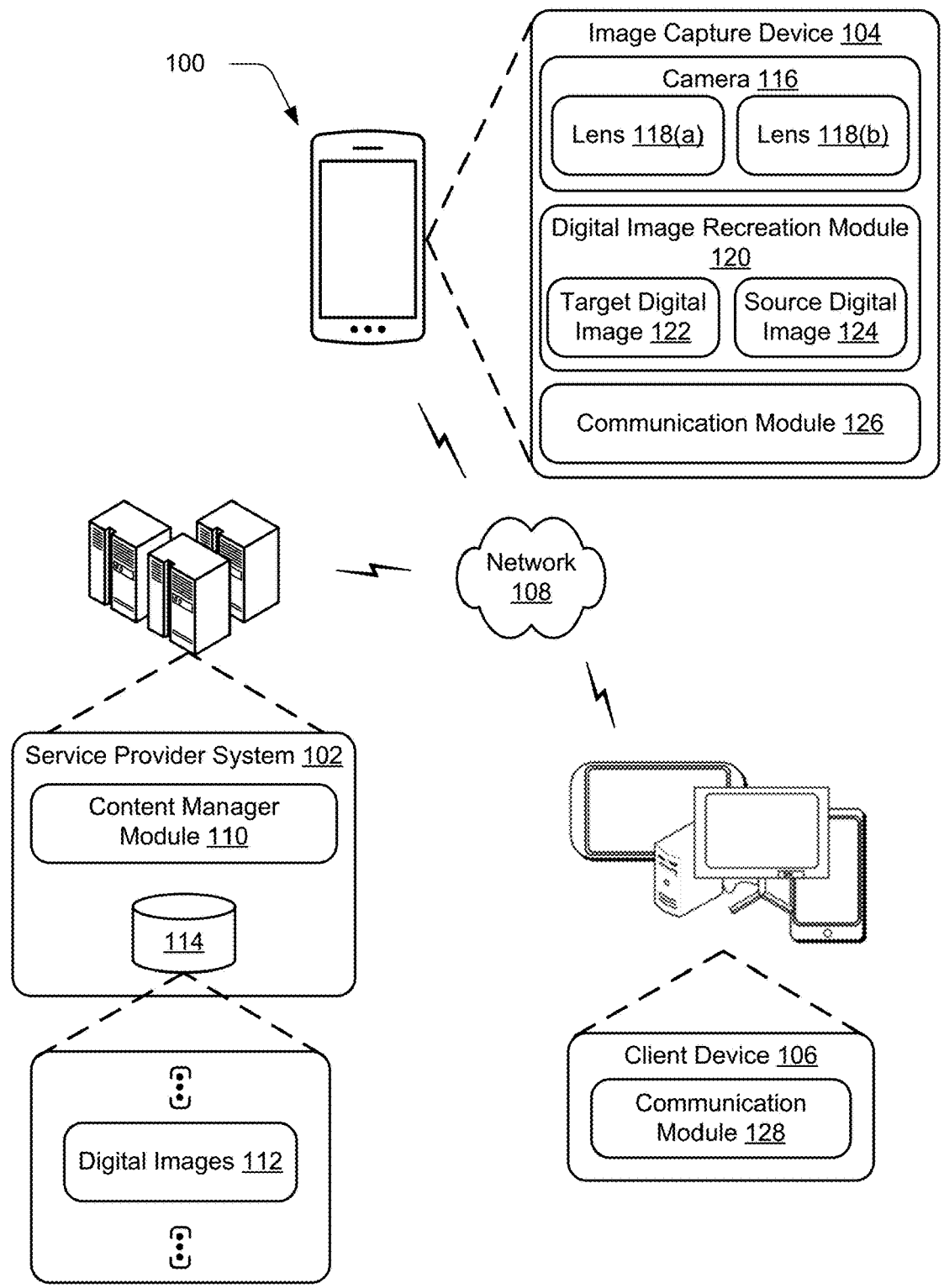
FIG. 1 is an illustration of an environment in an example implementation that is operable to employ techniques for removal of obstructions in a digital image scene as described herein.

The increasing mobility and accessibility of digital cameras has given users limitless opportunities to capture digital images in almost any environment. However, many environments inhibit the quality of a digital image of a desired subject because an obstruction between the camera and the subject blocks portions of the desired subject in the captured image. Current systems for removing obstructions from a captured image require a user to manually select the area of the obstruction, and to manually fill in the area of the obstruction, such as with a digital image editing application. Conventional systems for automatically removing obstructions have been proposed, but these systems involve capture of multiple images of the same scene from different angles and use of the multiple images to remove the obstruction. Limitations presented by conventional systems thus prohibit use in real-world scenarios from obtaining images of a desired subject without an obstruction in the images, especially for use by inexperienced photographers or users whose desired subject for a digital image is a moving object.

Accordingly, techniques and systems are described in which a digital image creation system is configured to remove obstructions from a digital image in a digital media environment. The digital image creation system, for instance, may be configured to allow creation and editing of digital images as part of an application of a computing device in a variety of different ways. Examples of which include use as part of an online application (via a subscription-based service system), provide opportunities to purchase a good or service, online storage, or other web service that is accessible via a network. Digital images may include a variety of different content that may be stored digitally or electronically, e.g., movies, books, documents, games, applications, images, audio files, and so on.

To begin, the digital image creation system obtains target and source digital images (also referred to simply as "images" in the following) that exhibit parallax, one to another. In one example, the target and source digital images are images that are captured together by an image capture device at a similar point in time using two different lenses of the image capture device. The image capture device may be a digital camera, a mobile phone, a tablet or slate device, laptop computer, webcam, or other device capable of capturing digital images. The terms "target digital image" and "source digital image" are a naming convention used to distinguish the two digital images captured together at a similar point in time by the two different lenses of the image capture device. However, it should be noted that these terms are not necessarily indicative of which lens captured which image or any other features of either image.

Because the two lenses are installed within the image capture device at different locations, the digital images captured from the two lenses at the similar point in time exhibit parallax. Generally, parallax is the effect whereby the position of an object appears to differ when viewed from different positions in a physical environment. Consequently, positions of objects captured in the target and source digital images appear to differ because the respective lenses captured the target and source digital images from different locations. Furthermore, objects that are nearer to the image capture device are affected more by parallax than objects that are further away from the image capture device. Therefore, foreground objects, such as an obstruction, appear to have a greater displacement, one to another, between the target and source digital images than background objects that are further away. Using the displacement of the apparent position of nearer and farther objects between the target and source digital images, a foreground obstruction is differentiated from a background scene shared between the target and source digital images by a computing device.

Consequently, the digital image creation system uses the exhibited parallax to identify a foreground obstruction in the digital image based on displacement in apparent position of objects in the target and source digital images. For example, the digital image creation system can identify a fence as a foreground obstruction of a background that includes a tennis player in both the target and source digital images. When the foreground obstruction is identified, the digital image creation system removes the foreground obstruction from the target digital image, which may be performed in a variety of ways.

One example technique for removal of a foreground obstruction is by generating an obstruction mask that represents the location of the foreground obstruction in the target digital image. To do so, the digital image creation system first aligns the target and source digital images based on the background scene shared between the images, thereby ignoring the foreground obstruction during the alignment. Then, the digital image creation system may correct colors of the target digital image to match colors of the source digital image to correct for variations in color profiles of the two lenses, slight differences in capture angle between the two lenses, and so forth.

Next, the digital image creation system converts the target and source digital images to grayscale images to begin generation of an obstruction mask. The digital image creation system may also alter colors of pixels in the grayscale target digital image to black if a difference between an average intensity in a window of size surrounding a pixel and an average intensity in a window of size surrounding a pixel at a similar location in the source digital image is less than a threshold amount. Thresholding is then performed on the target digital image to generate a binary obstruction mask that indicates the location of the obstruction in the target digital image. Thresholding is a technique of image segmentation that creates a binary, black and white image from a grayscale image by comparing intensity of pixels to a fixed intensity constant. Morphological operations, such as a dilate operation and/or an erode operation, can be performed on the obstruction mask to remove impurities after the thresholding is performed.

The digital image creation system also recreates the background scene using the obstruction mask as an identifier of locations to copy pixels from the source digital image into the target digital image. Copying pixels from the source digital image into the target digital image based on the locations identified in the obstruction mask yields a background scene without an obstruction blocking the desired subject of interest in the digital image. The image with the obstruction removed is then output by the digital image creation system, such as to a storage location of a user's digital images, a image editing application, a social networking application, and so forth.

Because the described techniques utilize target and source digital images captured by a single image capture device at a similar point in time, objects behind an obstruction are not required to stay stationary, making the techniques far more practical for everyday photographers over conventional techniques. Additionally, capturing the target and source digital images at the same time greatly reduces the chances of unwanted artifacts, such as the result of digital camera shake and so forth, that may result from multiple images captured at different points in time. Further, using the traits exhibited by parallax between the target and source digital images to automatically generate an obstruction mask for removal of an obstruction reduces user frustration with previous systems which required manual removal of image obstructions.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques for removal of obstructions from a digital image scene in a digital medium environment as described herein. The illustrated environment 100 includes a service provider system 102, an image capture device 104, and a client device 106 that are communicatively coupled, one to another, via a network 108. Computing devices that implement the service provider system 102, the image capture device 104, and the client device 106 may be configured in a variety of ways.

A computing device, for instance, may be configured as a desktop computer, a laptop computer, a mobile device (e.g., assuming a handheld configuration such as a tablet, digital camera, or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some examples, the computing device may be representative of a plurality of different devices, such as multiple servers utilized by a business to perform operations "over the cloud" as shown for the service provider system 102, and as further described in FIG. 7.

The service provider system 102 is illustrated as including a content manager module 110 that is implemented at least partially in hardware of a computing device. The content manager module 110 is configured to manage online interaction via the network 108 of the image capture device 104 and the client device 106 with digital images 112, which is stored in storage 114 of the service provider system 102. As previously described, the digital images 112 may take a variety of forms, such as any content that may be stored digitally or electronically, e.g., movies, books, documents, games, applications, images, audio files, and so on. Thus, interaction with the digital images 112 by the image capture device 104 and the client device 106 via the network 108 may also take a variety of forms, such as selection of a menu item, voice command, gesture, selection of a hyperlink, and so forth.

The image capture device 104 is shown as including a camera 116 that enables the image capture device to capture digital images. The camera 116 can include two or more lenses 118(a) and 118(b) that are each configured to capture a respective digital image simultaneously, or at a similar point in time, e.g., in response to a user input to capture an image. Dual-lens cameras are becoming increasingly accessible, including as a standard accessory with mobile phones and tablet devices. Dual-lens cameras and associated functionality can utilize two images taken with simpler, smaller, and/or less expensive components to generate a higher quality image than with a single, more advanced lens. For example, dual-lens cameras can be used to capture a regular image with one lens and capture depth perception data with the other lens, allowing users to add effects to an image's depth of field, change the angle of an image, add effects to a background of an image that is behind an object or person in the foreground, and so forth. Dual-lens cameras can also contain lenses of two different focal lengths to capture a close-up image of an object along with a wider-angle image of the same object at the same or similar point in time. Two lenses of a dual-lens camera, such as lens 118(a) and 118(b) of image capture device 104, can be installed in a device next to or near each other in order to achieve the described functionality.

The image capture device 104 also includes a digital image recreation module 120 to recreate digital images by removing obstructions from the scene of the digital image as discussed above and below. The image capture device 104 further includes a communication module 126 that enables the image capture device to interact with the digital images 112, such as by providing, accessing, and editing the digital images 112, e.g., as part of a subscription-based service.

In implementations, the digital image recreation module 120 obtains a target digital image 122 and a source digital image 124 that exhibit parallax, one to another. The digital image recreation module 120 can obtain the target and source digital images 122, 124 from the camera 116 of the image capture device 104, or from the digital images 112 located in the storage 114 of the service provider system 102 via the network 108, to name some examples. The target and source digital images 122, 124 are digital images that are captured together by an image capture device, such as the image capture device 104, at a similar point in time using the two different lenses 118(a) and 118(b). For example, the target and source digital images 122, 124 may be captured in response to a user selection to capture a digital image in a touch interface of the image capture device 104, in response to a button of the housing of the image capture device to capture a digital image being pressed, and so forth.

The digital image recreation module 120 identifies a foreground obstruction based on displacement in apparent position of objects in the target and source digital images 122, 124 resulting from the exhibited parallax. To do so, the digital image recreation module 120 identifies the foreground obstruction using a notion that objects nearer to the image capture device 104 are affected more by parallax than objects that are further away from the image capture device. Therefore, foreground objects, such as an obstruction, appear more displaced between the target and source digital images 122, 124 than background objects that are further away. Using the displacement of the apparent position of nearer and farther objects between the target and source digital images, the digital image recreation module 120 differentiates a foreground obstruction from a background scene shared between the target and source digital images 122, 124.

The digital image recreation module 120 then removes the identified foreground obstruction from the target digital image 122 utilizing the exhibited parallax between the target digital image and the source digital image 124, as detailed below. The target digital image 122 with the foreground obstruction removed can be output by the communication module 126, such as to the service provider system 102 to be stored in the storage 114. The service provider system 102 can make digital images 112 available to additional devices, for example the client device 106 utilizing a communication module 128 via the network 108, e.g., part of a subscription-based service.

Figure 2:
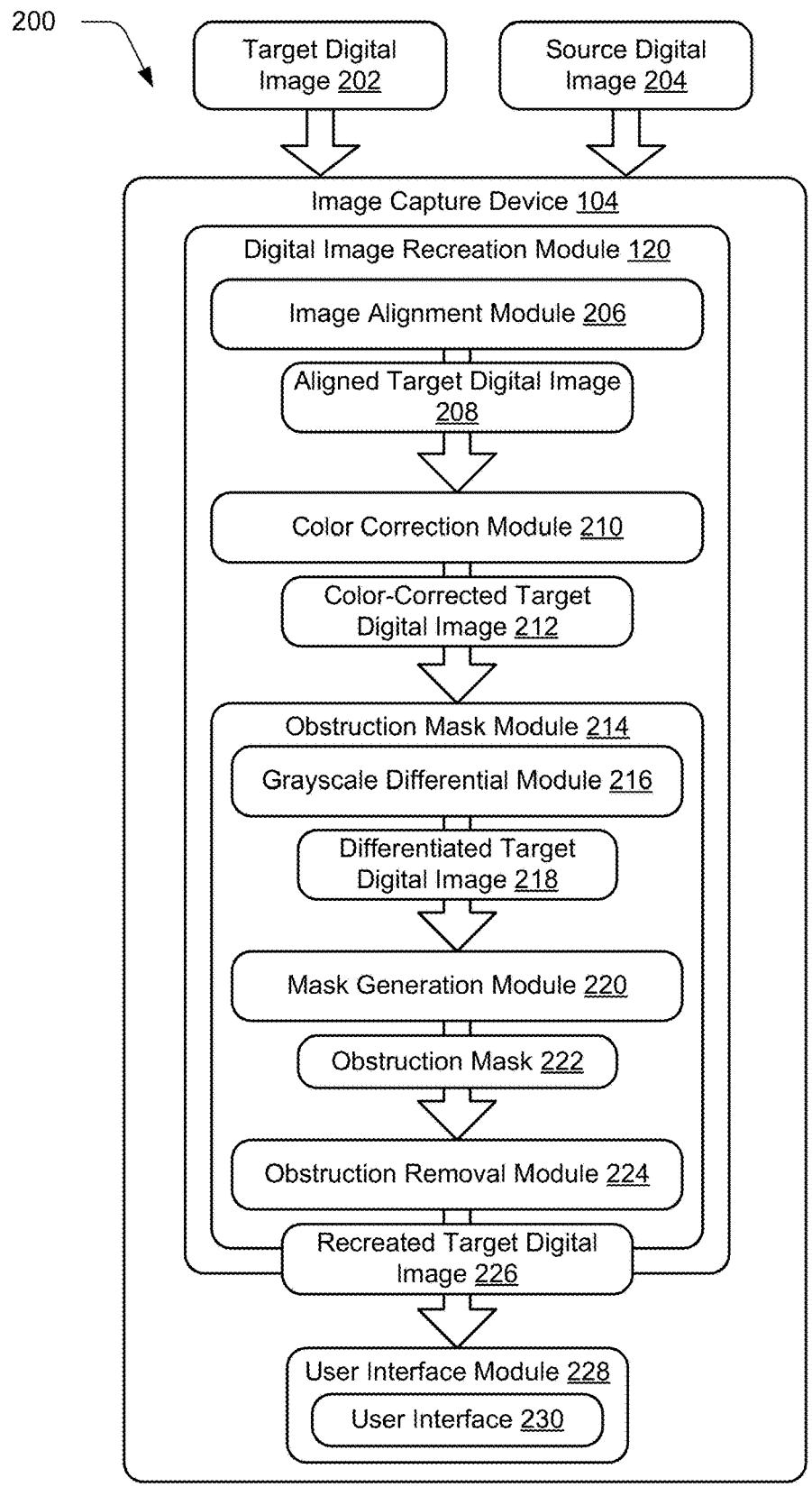
FIG. 2 depicts a system in an example implementation showing operation of a digital image recreation module of FIG. 1 in greater detail.

FIG. 2 depicts a system 200 in an example implementation showing operation of the digital image recreation module 120 of FIG. 1 in greater detail. To begin this example, a target digital image 202 and a source digital image 204 are received by the digital image recreation module 120. The target digital image 202 and the source digital image 204 are captured by two lenses of a camera of the image capture device 104 simultaneously or at a similar point in time. In one example, a user interface of the image capture device 104 may provide a user-selectable option to capture two images at once from among different image capture options. In another example, the image capture device 104 may capture the target digital image 202 and the source digital image 204 by default with each digital image taken by the image capture device, and may discard one of the images if no obstruction is detected. In yet another example, the image capture device 104 may automatically detect when obstructions are present before a digital image is captured, and cause the two lenses to capture the target digital image 202 and the source digital image 204 as a result of the detection of the obstruction. Other examples for obtaining the target digital image 202 and the source digital image 204 are also contemplated.

An image alignment module 206 aligns the target digital image 202 and the source digital image 204 based on a background of the scene in the target and source digital images, ignoring the foreground obstruction. The image alignment module 206 may use an ORB (oriented FAST and rotated BRIEF) feature detector, for example, to align the target digital image 202 and the source digital image 204 based on objects in the background of the target and source digital images. The image alignment module 206 corrects differences between the target digital image 202 and the source digital image 204 due to different fields of view of the two lenses that captured the target and source digital images.

Figure 3:
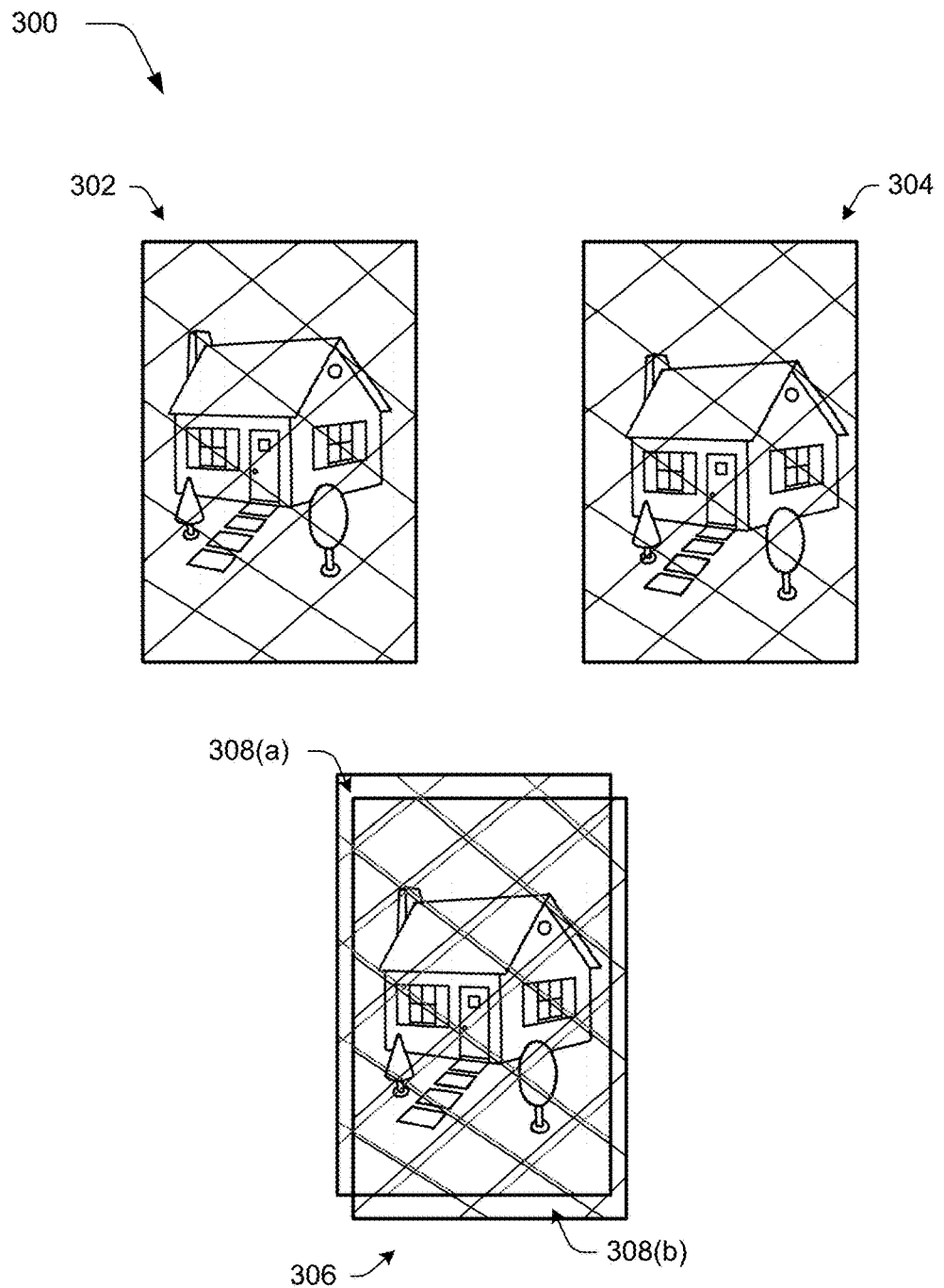
FIG. 3 depicts an example of parallax exhibited by a target and a source digital image which may be utilized by the obstruction removal techniques described herein.

For example, consider FIG. 3 depicting an example of aligning target and source digital images generally at 300, which may be used in an example implementation for removal of obstructions from a digital image scene in a digital media environment. In this example, a target digital image 302 and a source digital image 304 are depicted. The target digital image 302 and the source digital image 304 are images that were captured by an image capture device at the same, or similar, point in time using two different lenses. Because of the effect of parallax caused by the two lenses being at different locations when the target and source digital images 302, 304 were captured, objects in the two images appear at slightly different locations.

The target digital image 302 and the source digital image 304 are aligned based on a background of the scene in the target and source digital images, ignoring the foreground obstruction. Alignment of the target digital image 302 with the source digital image 304 may be performed using an ORB (oriented FAST and rotated BRIEF) feature detector, for example, using features in the background of the target and source digital images as a basis for alignment. When the features in the background of the target digital image 302 and the source digital image 304 are aligned, the effect of parallax on the two images is displayed in overlay 306. The overlay 306 depicts how although the background objects appear in the same location, parallax affects the location of the foreground obstruction because of the foreground obstruction's closer distance to the two lenses of the image capture device. The overlay 306 also shows portions 308(a) and 308(b) of the target digital image 302 and the source digital image 304 that do not overlap, which may be removed to provide accurate relative locations of background objects within the aligned target and source digital images when the aligned target and source digital images are used in later processing.

Returning to a discussion of FIG. 2, a color correction module 210 receives the aligned target digital image 208 to correct one or more colors of the aligned target digital image to match one or more colors of the source digital image 204. Even though the target digital image 202 and the source digital image 204 were captured at the same (or similar) point in time, the colors of the target and source digital images may differ due to different color profiles of the respective lenses and the slight difference in capture angle of the respective lenses. The color correction module 210 detects the differences in the colors of the aligned target digital image 208 and the source digital image 204, and alters colors of the aligned target digital image to match the colors of the source digital image to generate a color-corrected target digital image 212.

The color correction module 210 can use, for example, adaptive histogram matching to alter the colors of the aligned target digital image 208 to match the colors of the source digital image 204. To do so, the color correction module 210 divides both the aligned target digital image 208 and the source digital image 204 into multiple tiles. The color correction module 210 then performs a histogram matching technique between a tile of the aligned target digital image and a tile of the aligned source digital image at the same or similar locations in the respective images.

Next, an obstruction mask module 214 receives the color-corrected target digital image 212 and uses the color-corrected target digital image to generate an obstruction mask representing locations of the foreground obstruction in the color-corrected target digital image. To generate the obstruction mask, a grayscale differential module 216 is employed to first generate grayscale images from the color-corrected target digital image 212 and the source digital image 204. Then, the grayscale differential module 216 performs an adaptive custom differential technique on the grayscale color-corrected target digital image 212.

To perform the adaptive custom differential technique, the grayscale differential module 216 identifies a particular pixel of the grayscale color-corrected target digital image 212, and a pixel at a same or similar location as the particular pixel in the grayscale source digital image 204. Then, the grayscale differential module 216 determines average intensities in a window of size surrounding the particular pixel in both the grayscale color-corrected target digital image 212 and the grayscale source digital image 204. The window of size surrounding the particular pixels may be, for example, nine pixels by nine pixels surrounding the particular pixels, although any window of size may be used.

The grayscale differential module 216 subtracts the average intensity of the window surrounding the particular pixel in the grayscale color-corrected target digital image 212 from the average intensity of the window surrounding the particular pixel in the grayscale source digital image 204. If the difference in the average intensity is less than a threshold amount (e.g., threshold of 20 on a 0-255 RGB pixel intensity scale), then the grayscale differential module 216 alters the color of the particular pixel to black. Otherwise, if the average intensity is greater than the threshold amount, then the color of the pixel is not altered, remaining the same as in the grayscale color-corrected target digital image 212.

Then, an additional pixel is selected from the grayscale color-corrected target digital image 212. The average intensity within a window of size surrounding the additional pixel is determined and compared to the average intensity surrounding the additional pixel's counterpart in the grayscale source digital image 204. The grayscale differential module 216 alters the additional pixel to black if the difference in the average intensities is less than the threshold amount, and the process is repeated for multiple pixels in the grayscale color-corrected target digital image 212. The grayscale differential module 216 completes the adaptive custom differential on the grayscale color-corrected target digital image 212, thus generating a differentiated target digital image 218.

The differentiated target digital image 218 represents a preliminary indication of the locations of the obstruction in the original target digital image 202. Because of parallax created by the two lenses that captured the target and source digital images, the obstruction in the source digital image 204 appears at a different location than the same obstruction in the target digital image 202. Therefore, a high difference in intensity at the same or similar locations in the two images indicates the presence of the obstruction in one of the two images at that location. Comparing the average intensity in a window of size surrounding a particular pixel in the grayscale color-corrected target digital image 212 to an average intensity at a similar location in the grayscale source digital image 204 gives accurate results of locations of the obstruction in the grayscale color-corrected target digital image.

Figure 4:
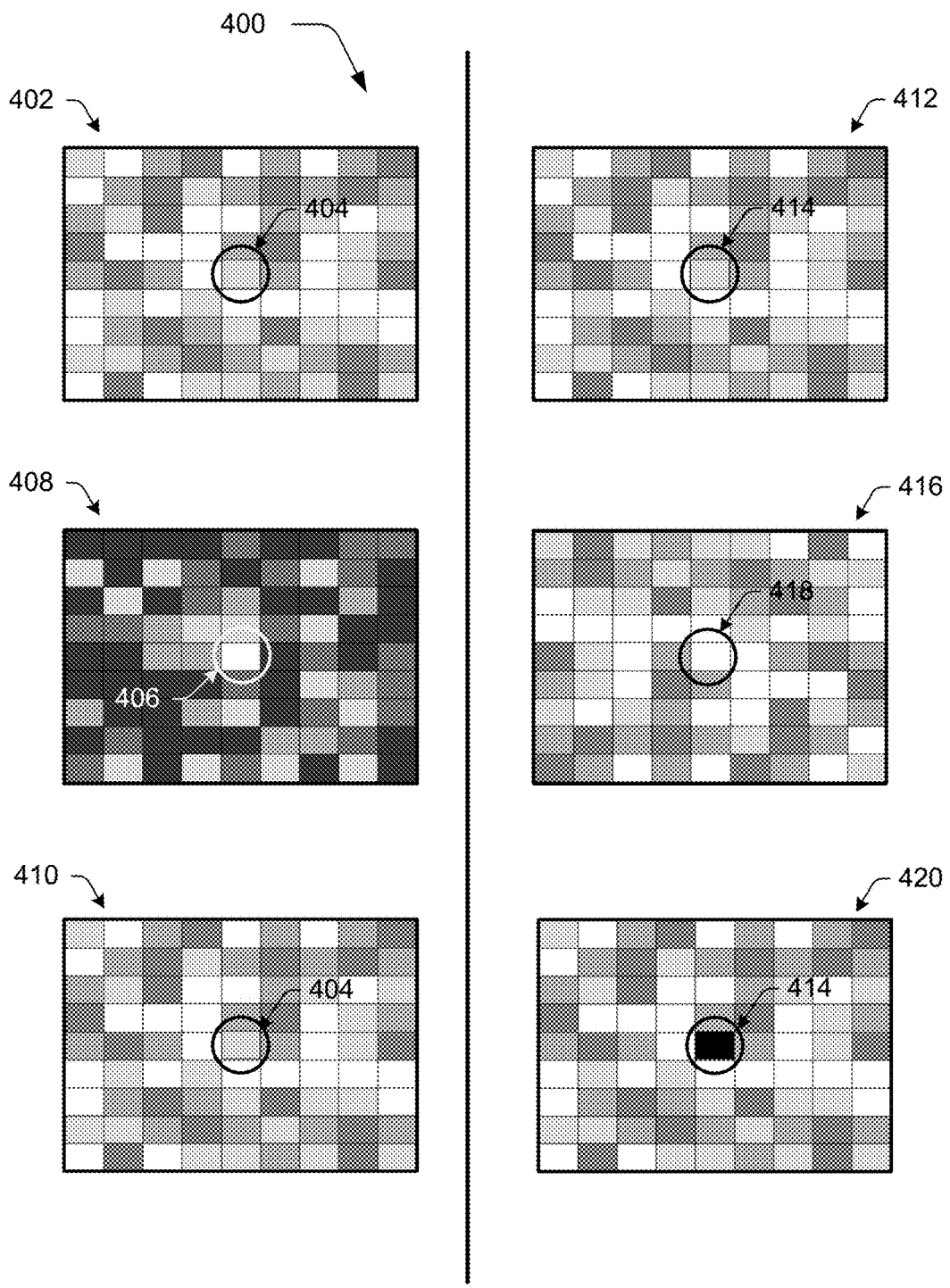
FIG. 4 depicts an example of using an average difference of pixel intensity in a window of size surrounding a particular pixel as part of generating an obstruction mask for obstruction removal techniques described herein.

In an example, consider FIG. 4 depicting an instance of adaptive custom differential generally at 400, which may be used in an example implementation for removal of obstructions from a digital image scene in a digital media environment. A window of pixels 402 is shown that surrounds a particular pixel 404 selected from a target digital image. In this example, the window of pixels 402 is nine pixels by nine pixels, and the particular pixel 404 is located at the center of the window of pixels. An average intensity of the pixels in the window of pixels 402 can be determined, such as by the grayscale differential module 216.

Using the location of the particular pixel 404 as a reference point, the grayscale differential module 216 locates an additional particular pixel 406 in a source digital image that is at the same or a similar location as the particular pixel in the target digital image. As discussed with regard to target and source digital images herein, the target digital image and the source digital image in this example were captured at the same, or similar, point in time. However, the intensities of the pixels in a window of pixels 408 surrounding the additional particular pixel 406 of the source digital image may deviate significantly from the intensities found in the window of pixels 402 of the target digital image. A common reason for this occurring is that because of the effect of parallax, the source digital image at the location of the additional particular pixel 406 contains a foreground obstruction. Consequently, even though the target digital image and the source digital image in this example were aligned based on a background scene shared between the two images, the foreground obstruction appears at different locations because of the effect of parallax.

The grayscale differential module 216 determines an average intensity of the pixels within the window of pixels 408 surrounding the additional particular pixel 406 from the source digital image. The grayscale differential module 216 then compares the average intensity of the window of pixels 402 to the average intensity of the window of pixels 408. If the difference between the average intensity in the window of pixels 408 from the average intensity in the window of pixels 402 is greater than a threshold amount (e.g., a threshold of 20 on a 0-255 RGB pixel intensity scale, although any suitable threshold amount may be used), then the grayscale differential module 216 does not alter the intensity of the particular pixel 404 in the target digital image. This is indicated by the window of pixels 410, where the particular pixel 404 remains the same intensity as it appeared before the comparison in the window of pixels 402.

In another example, consider a window of pixels 412 that surrounds a particular pixel 414 selected from a target digital image, and a window of pixels 416 that surrounds an additional particular pixel 418 from a source digital image. Again, the additional particular pixel 418 can be selected from the source digital image based on being located at the same, or a similar, location to the location of the particular pixel 414 of the target digital image.

Similar to the discussion above, the grayscale differential module 216 can determine an average intensity of the window of pixels 412, and an average intensity of the window of pixels 416. Then, the grayscale differential module 216 compares the average intensity of the window of pixels 402 to the average intensity of the window of pixels 408. If the difference between the average intensity in the window of pixels 416 from the average intensity in the window of pixels 412 is less than a threshold amount (e.g., a threshold of 20 on a 0-255 pixel intensity scale, although any suitable threshold amount may be used), then the grayscale differential module 216 alters the intensity of the particular pixel 414 to black as shown in the window of pixels 420.

This example of altering the color of the pixel 414 to black in the window of pixels 420 represents a case where the source digital image does not include a foreground obstruction at the location of the pixel 418. Therefore, the pixels in the window of pixels 412 are generally a similar intensity to the pixels in the window of pixels 416. When the target and source digital images are aligned based on objects appearing in the background of the two images, the likelihood of pixels being a similar intensity at the same or similar locations is relatively high as long as there is no foreground obstruction at that location. This provides an accurate basis for generating an obstruction mask.

The process of selecting a particular pixel at the same, or a similar, location from the target and source digital images, comparing an average intensity of pixels in a window of size surrounding the particular pixels, and altering the color of the particular pixel from the target digital image to black can be repeated for multiple pixels in the target digital image. The result is a preliminary obstruction mask, where the background scene is represented by the pixels that have been altered to black, and intensities of the pixels at the locations of the foreground obstruction remain the same intensity. A mask generation module 220, discussed in detail below, can perform thresholding on this preliminary obstruction mask to create a binary image of the locations of the obstruction. The thresholding alters any pixels that are not black, in this case any pixels that were left unaltered during the adaptive custom differential, to white to create the binary image of the obstruction.

Returning to the discussion of FIG. 2, the mask generation module 220 receives the differentiated target digital image 218, and uses the differentiated target digital image to generate a mask that includes locations of the foreground obstruction in the image scene. The mask generation module 220 first thresholds the differentiated target digital image 218 to generate a binary obstruction mask made up of white and black regions. Thresholding is a technique of image segmentation that creates a binary, black and white image from a grayscale image by comparing intensity of pixels to a fixed intensity constant.

The mask generation module 220 then replaces pixels of the differentiated target digital image 218 with a greater intensity than the fixed intensity constant with white pixels, and replaces the pixels of the differentiated target digital image that have a lesser intensity than the fixed intensity constant with black pixels. The mask generation module 220 can then perform morphological operations, such as a dilate operation and/or an erode operation, to remove small impurities that may exist after the thresholding. The mask generation module 220 outputs an obstruction mask 222 that accurately represents the locations of the obstruction in the original target digital image 202.

Figure 5:
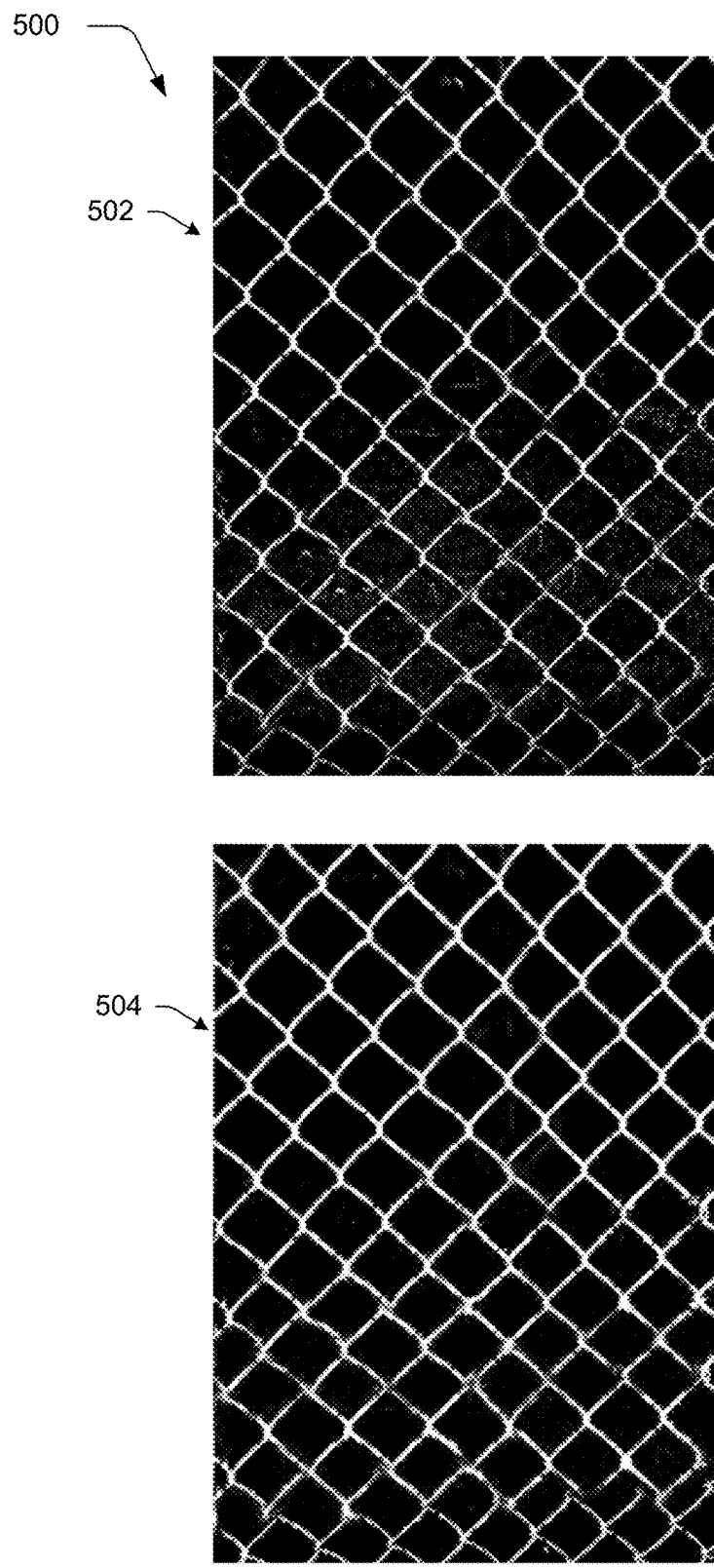
FIG. 5 depicts an example of an obstruction mask before and after removing impurities which may be implemented with obstruction removal techniques described herein.

For example, consider FIG. 5 depicting examples of an obstruction mask generally at 500, which may be used in an example implementation for removal of obstructions from a digital image scene in a digital media environment. A binary obstruction mask 502 is depicted, made up of black and white regions as a result of the mask generation module 220 thresholding the differentiated target digital image 218. As discussed above, thresholding is a technique of image segmentation that creates a binary, black and white image from a grayscale image by comparing intensity of pixels to a fixed intensity constant.

Continuing with the example described in relation to FIG. 4, pixels of a target digital image determined to represent the background of the image were altered to black, while pixels of the target digital image determined to represent the foreground obstruction remained the same intensity. Therefore, the mask generation module 220 may set a threshold value for intensity of the pixels close to the intensity of black when thresholding, resulting in the previously unaltered pixels of the foreground obstruction being altered to white during the thresholding operation. Morphological operations, such as a dilate operation and/or an erode operation, can be performed on the binary obstruction mask 502, yielding the final obstruction mask 504 with impurities removed.

An obstruction removal module 224 receives the obstruction mask 222 to use as a map for removing the obstruction from the color-corrected target digital image 212. The color-corrected target digital image 212 is used for obstruction removal to minimize any color differences that may appear between the target digital image 202 and source digital image 204 when pixels are copied from the source to the target digital image. The obstruction removal module 224 identifies locations of white pixels in the obstruction mask 222, and copies pixels from the source digital image 204 at the locations of the white pixels in the obstruction mask into the color-corrected target digital image 212. Because of the effect of parallax, the obstruction appears in different locations in the color-corrected target digital image 212 and in the source digital image 204. Therefore, pixels copied from locations indicated in the obstruction mask 222 from the source digital image 204 generally do not include the obstruction, but rather include portions of the background scene blocked by the obstruction in the target digital image 202.

Alternatively, the obstruction removal module 224 may use the obstruction mask 222 as an ignore mask, and fill in an area of the target digital image indicated by white pixels in the obstruction mask with adaptive content-aware fill. In this process, the obstruction mask 222 is divided into blocks, such as 64 pixels by 64 pixels, although any size blocks may be used. Then, for each of the blocks, template-based matching is performed by locating a region in the source digital image 204 in which neighboring pixels match with neighboring pixels at the location of the current block in the target digital image 202. Once the region in the source digital image is located, pixels from the source digital image 204 in the region are copied into the region in the target digital image 202. This process can be repeated for multiple blocks of the obstruction mask 222.

The obstruction removal module 224 outputs a recreated target digital image 226 that includes the background scene from the original target digital image 202 with the obstruction removed using the obstruction mask 222. The obstruction removal module 224 can output the recreated target digital image 226 to a user interface module 228, which outputs the recreated target digital image in a user interface 230 of the image capture device 104. The user interface 230 may enable a user of the image capture device 104 to edit or modify the recreated target digital image 226, and/or distribute the recreated target digital image to the service provider system 102 or additional client devices 106 of FIG. 1, to name some examples. Using the techniques described herein, obstructions can be removed from digital images automatically, and without any further input from a user other than an indication to capture a digital image.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
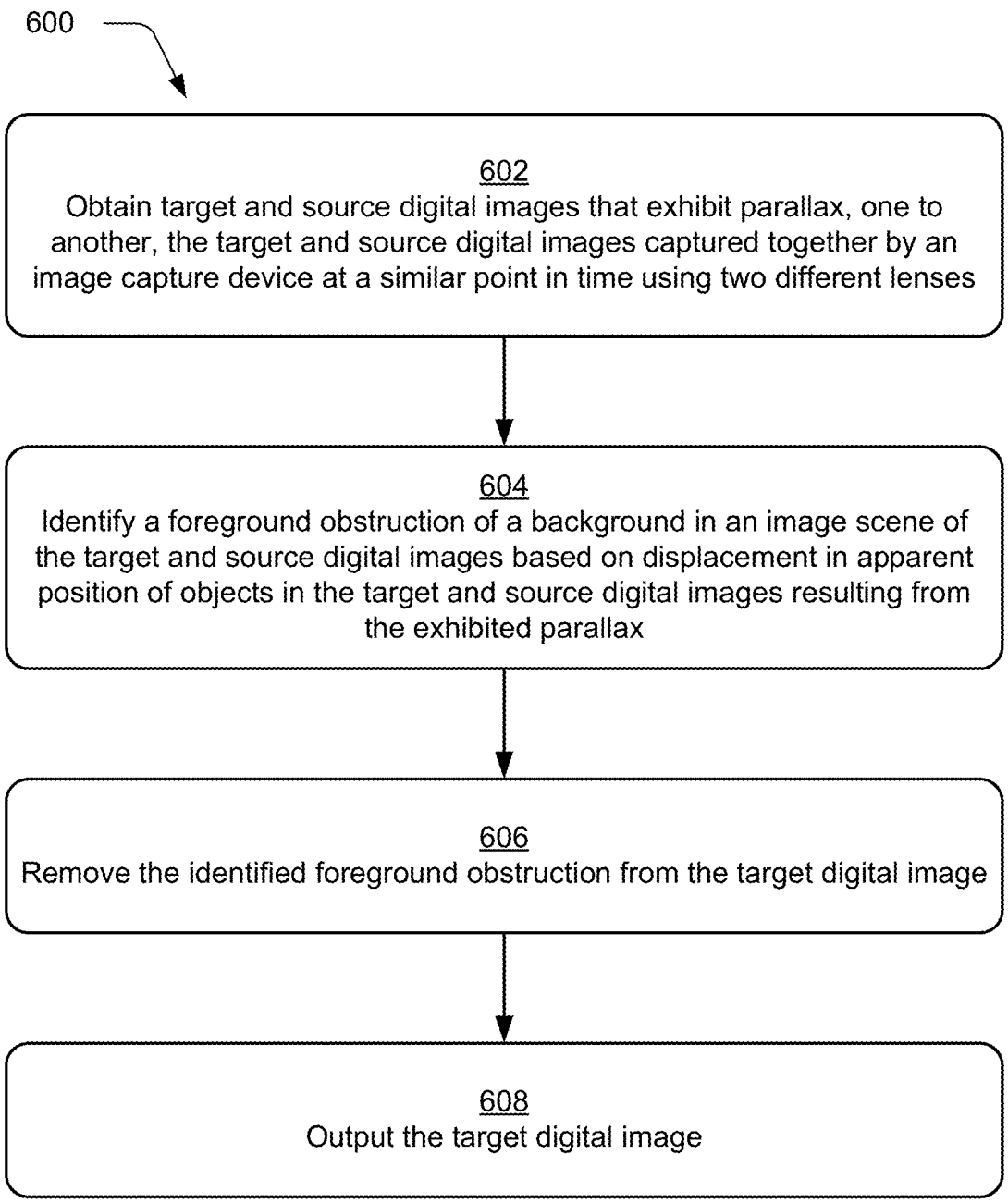
FIG. 6 is a flow diagram depicting a procedure in an example implementation in which obstructions are removed from a digital image scene in a digital image creation system.

FIG. 6 depicts a procedure 600 in an example implementation in which an obstruction is removed from a digital image scene in a digital image creation system of a digital medium environment. First, target and source digital images are obtained that exhibit parallax, one to another (block 602). The target and source digital images are images captured together by an image capture device a same, or similar, point in time using two different lenses of the image capture device. As discussed above, the terms "target digital image" and "source digital image" are used to distinguish the two images captured together at a similar point in time by the two different lenses of the image capture device, but these terms are not necessarily indicative of which lens captured which image or any other features of either image. Because the two lenses are installed within the image capture device at different locations, the images captured from the two lenses at the similar point in time will exhibit parallax. Because of the effect of parallax, positions of objects captured in the target and source digital images will appear to differ because the respective lenses captured the target and source digital images from slightly different locations.

A foreground obstruction of a background is identified in an image scene of the image based on displacement in apparent position of objects in the target and source digital images (block 604). The foreground obstruction is identified based on displacement in the apparent position resulting from the exhibited parallax between the target and source digital images. The digital image recreation module 120 can identify the foreground obstruction using the notion that objects nearer to the image capture device 104 are affected more by parallax than objects that are further away from the image capture device. Therefore, foreground objects, such as an obstruction, appear more displaced between the target and source digital images than background objects that are further away.

Using the displacement of the apparent position of nearer and farther objects between the target and source digital images, the digital image recreation module 120 differentiates a foreground obstruction from a background scene shared between the target and source digital images. For example, the grayscale differential module 216 can compare an average intensity in a window of size surrounding a particular pixel of the target digital image to an average intensity in a window of size surrounding a particular pixel, at the same or similar location, of the source digital image. If the difference in average intensities between the target and source digital images in the windows of size surrounding the particular pixels is greater than a threshold amount, the particular pixel in the target digital image can be identified as part of the foreground obstruction.

Then, the identified foreground obstruction is removed from the target digital image (block 606). Using an obstruction mask generated by the mask generation module 220 using locations of the identified foreground obstruction, the obstruction removal module 224 copies pixels at the locations of the identified foreground obstruction from the source digital image to the target digital image. Copying the pixels at the location of the identified foreground obstruction from the source digital image to the target digital image results in the foreground obstruction being replaced with pixels representing the background of the image scene of the two images. Finally, the target digital image is output with the identified obstruction removed (block 608). For example, the target digital image with the identified obstruction removed can be output in a user interface 230 of a user interface module 228, to a service provider system 102 for access by additional client devices as part of a subscription-based service, and so forth.

Example System and Device

Figure 7:
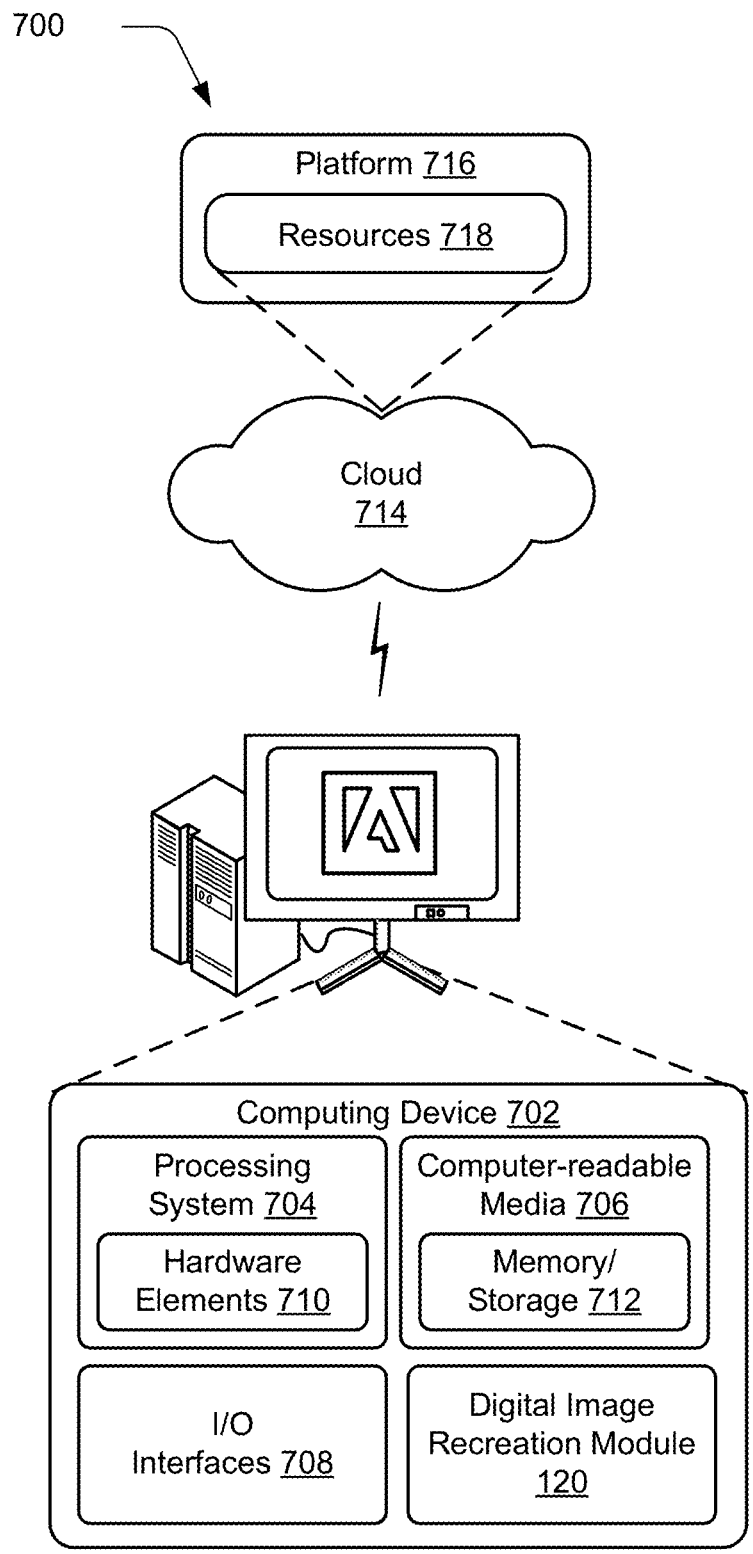
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the digital image recreation module 120. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device for digital image obstruction removal, the method comprising:
   receiving, by the at least one computing device, a single user input to capture an image scene;
   prior to capturing the image scene by an image capture device of the at least one computing device, detecting a foreground obstruction of a background in the image scene;
   in response to the single user input and based on detecting the foreground obstruction, causing the image capture device to simultaneously capture target and source digital images of the image scene using two different lenses of the image capture device;
   obtaining, by the computing device, the target and source digital images of the image scene captured by the two different lenses of the image capture device, the target and source digital images exhibiting parallax, one to another;
   automatically identifying, by the computing device without additional user input, the foreground obstruction of a background in the image scene of the target and source digital images based on displacement in apparent position of objects in both the target and source digital images resulting from the exhibited parallax;
   removing, by the computing device, the identified foreground obstruction from the target digital image; and
   outputting, by the computing device, the target digital image.

2. The method of claim 1, further comprising aligning, by the at least one computing device, the target digital image with the source digital image based on the background of the image scene captured by the target and source digital images.

3. The method of claim 1, further comprising adjusting, by the at least one computing device, at least one color of the background of the image scene in the target digital image to match at least one color of the background of the image scene in the source digital image.

4. The method of claim 3, wherein the adjusting further comprises dividing the target digital image and the source digital image into multiple tiles, and performing histogram matching between tiles in the target digital image and tiles in the source digital image.

5. The method of claim 1, further comprising generating, by the at least one computing device, an obstruction mask for the target digital image by:
altering a color of a pixel in the target digital image to black if a difference between an average intensity in a window of size surrounding the pixel and an average intensity in a window of size surrounding a pixel at a similar location in the source digital image is less than a threshold amount.

6. The method of claim 5, wherein the generating further comprises repeating the altering for multiple pixels in the target digital image.

7. The method of claim 6, wherein the generating further comprises thresholding the target digital image by altering a color of pixels of the target digital image to white that were not altered to black to generate a binary target digital image for the obstruction mask.

8. The method of claim 7, wherein the generating further comprises performing one or more morphological operations to remove remaining impurities from the binary target digital image for the obstruction mask.

9. The method of claim 1, wherein the removing the identified foreground obstruction comprises copying pixels from the source digital image to the target digital image that correspond to locations of the foreground obstruction using an obstruction mask.

10. The method of claim 1, wherein removing the identified foreground obstruction comprises filling pixels from the target digital image that correspond to locations of the foreground obstruction using adaptive content-aware fill, wherein the locations of the foreground obstruction are determined based on an obstruction mask of the foreground obstruction.

11. A system to remove an obstruction from digital images in a digital image creation system, the system comprising:
a digital image alignment module implemented at least partially in hardware of a computing device to align target and source digital images that exhibit parallax, one to another, the target and source digital images captured substantially simultaneously together by an image capture device using two different lenses;
a color correction module implemented at least partially in hardware of the computing device to adjust at least one color of an image scene of a background in the target digital image to match at least one color of the image scene of the background of the source digital image;
an obstruction removal module implemented at least partially in hardware of the computing device to:
identify a foreground obstruction from the image scene in the target and source digital images based on displacement in apparent position of objects in the target and source digital images resulting from the exhibited parallax;
generate an obstruction mask based on a location of the foreground obstruction in the image scene; and
remove the foreground obstruction from the target digital image based on the obstruction mask; and
a digital image output module implemented at least partially in hardware of the computing device to output the target digital image with the foreground obstruction removed, wherein the system is configured to discard one of the target digital image or source digital image if the foreground obstructions is not identified by the obstruction removal module.

12. The system as described in claim 11, wherein the digital image alignment module aligns the target and source digital images based on the background of the image scene of the target and source digital images.

13. The system as described in claim 11, wherein the color correction module adjusts the at least one color of the image scene of the background of the target digital image by dividing the target digital image and the source digital image into multiple tiles, and performing histogram matching between tiles in the target digital image and tiles in the source digital image.

14. The system as described in claim 11, wherein the obstruction removal module identifies the foreground obstruction by altering a color of a pixel in the target digital image to black if a difference between an average intensity in a window of size surrounding the pixel and an average intensity in a window of size surrounding a pixel at a similar location in the source digital image is less than a threshold amount.

15. The system as described in claim 12, wherein the obstruction removal module generates the obstruction mask by thresholding the target digital image by altering a color of pixels of the target digital image to white that were not altered to black to generate a binary target digital image for the obstruction mask.

16. The system as described in claim 11, wherein the obstruction removal module removes the foreground obstruction by copying pixels from the source digital image to the target digital image that correspond to locations of the foreground obstruction using the obstruction mask.

17. A system to remove an obstruction from digital images in a digital image creation system, the system comprising:
means for obtaining target and source digital images that exhibit parallax, one to another, the target and source digital images captured together by an image capture device at a similar point in time using two different lenses of a single image capture device in response to a single user input;
means for identifying a foreground obstruction of a background in an image scene of the target and source digital images based on displacement in apparent position of objects in the target and source digital images resulting from the exhibited parallax;
means for removing the identified foreground obstruction from the target digital image if the foreground obstruction is detected;
means for discarding the source digital image if the foreground obstruction is not detected; and
means for outputting the target digital image.

18. The system as described in claim 17, wherein the system further comprises means for generating an obstruction mask for the foreground obstruction by altering a color of a pixel in the target digital image to black if a difference between an average intensity in a window of size surrounding the pixel and an average intensity in a window of size surrounding a pixel at a similar location in the source digital image is less than a threshold amount.

19. The system as described in claim 18, wherein the means for generating the obstruction mask are configured to threshold the target digital image by altering a color of pixels of the target digital image to white that were not altered to black to generate a binary target digital image for the obstruction mask.

20. The system as described in claim 17, wherein the means for removing the identified foreground obstruction are configured to copy pixels from the source digital image to the target digital image that correspond to locations of the foreground obstruction using an obstruction mask.

* * * * *